(12) United States Patent
Panosian et al.

(10) Patent No.: US 11,037,315 B2
(45) Date of Patent: Jun. 15, 2021

(54) DUAL LASER MEASURING DEVICE AND ONLINE ORDERING SYSTEM USING THE SAME

(71) Applicant: TOUGHBUILT INDUSTRIES, INC., Lake Forest, CA (US)

(72) Inventors: Michael H. Panosian, Irvine, CA (US); Joshua Keeler, Lake Forest, CA (US)

(73) Assignee: TOUGHBUILT INDUSTRIES, INC., Lake Forest, CA (US)

( * ) Notice: Subject to any disclaimer, the term of this patent is extended or adjusted under 35 U.S.C. 154(b) by 55 days.

(21) Appl. No.: 16/506,750

(22) Filed: Jul. 9, 2019

(65) Prior Publication Data

US 2020/0013177 A1  Jan. 9, 2020

Related U.S. Application Data

(60) Provisional application No. 62/695,286, filed on Jul. 9, 2018.

(51) Int. Cl.
*G06T 7/564* (2017.01)
*H04N 5/232* (2006.01)
*G01B 11/02* (2006.01)
*G01B 11/14* (2006.01)

(52) U.S. Cl.
CPC .......... *G06T 7/564* (2017.01); *G01B 11/026* (2013.01); *G01B 11/14* (2013.01); *H04N 5/23216* (2013.01)

(58) Field of Classification Search
CPC .. G06T 7/564; H04N 5/23216; G01B 11/026; G01B 11/14
See application file for complete search history.

(56) References Cited

U.S. PATENT DOCUMENTS

| | | | |
|---|---|---|---|
| 2005/0168721 A1 | 8/2005 | Huang | |
| 2015/0066439 A1* | 3/2015 | Jones | G06T 17/00 703/1 |
| 2016/0187120 A1* | 6/2016 | Lin | G01S 7/4813 356/627 |
| 2018/0335508 A1 | 11/2018 | Lewis | |

FOREIGN PATENT DOCUMENTS

| | | |
|---|---|---|
| CN | 103403493 A | 11/2013 |
| EP | 2088453 A1 | 8/2009 |
| GB | 2534190 A | 7/2016 |
| WO | WO2019059860 | 3/2019 |

OTHER PUBLICATIONS www.magpie-tech.com.
Wiseome Inc. under the brand "iPin Spacial Ruler Pro".

* cited by examiner

*Primary Examiner* — Ruiping Li
(74) *Attorney, Agent, or Firm* — Nolte Lackenbach Siegel; Myron Greenspan

(57) ABSTRACT

A laser measurer comprising a housing defining a direction along which a linear measurement is to be made; first and second lasers within said housing for generating two laser beams emanating from said housing in opposite or opposing directions along said measurement direction; level compensation within said housing; and an app for performing computations to provide linear, surface and volume data.

9 Claims, 9 Drawing Sheets

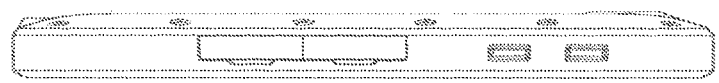
FIG. 1A
 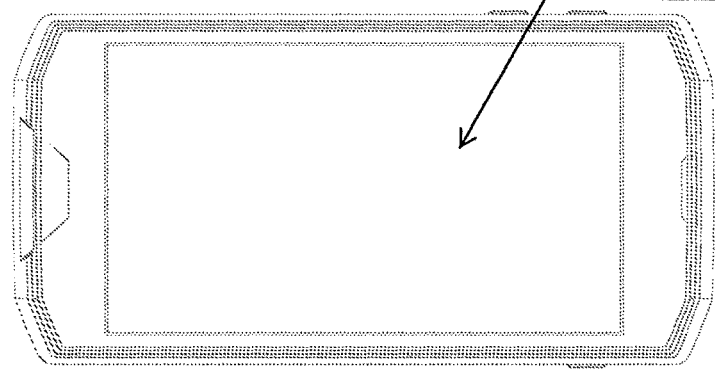 
FIG. 1C  FIG. 1B  FIG. 1D
FIG. 1E
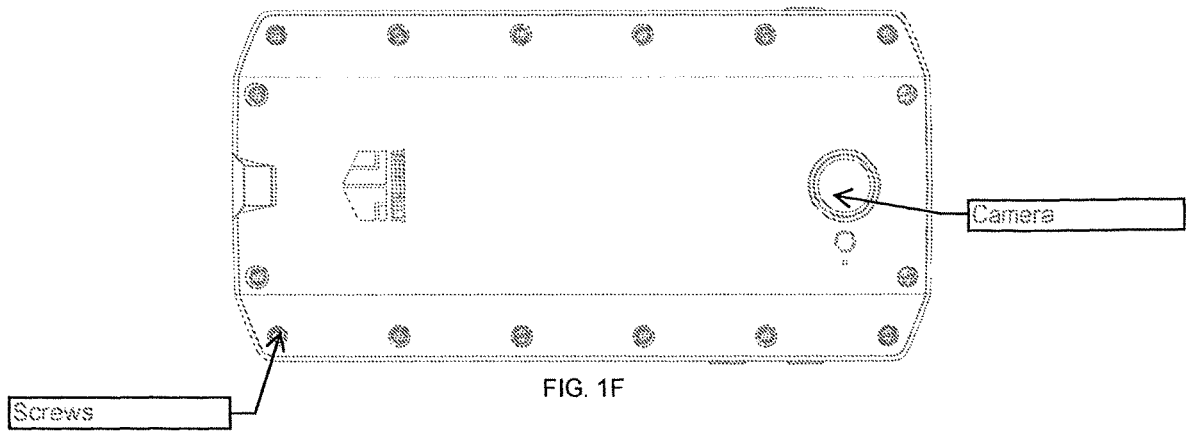
FIG. 1F

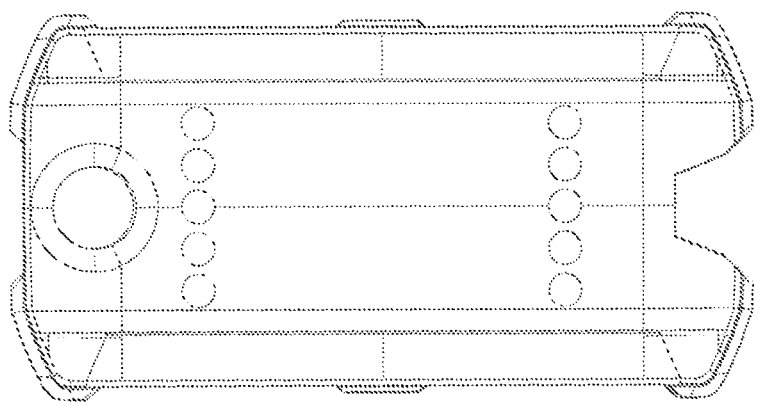
FIG. 2A
FIG. 2B
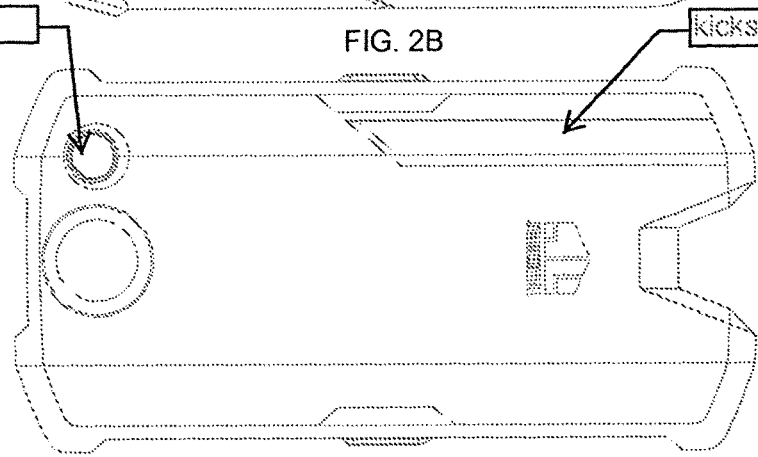
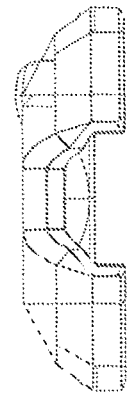
FIG. 2C  FIG. 2E  FIG. 2D
FIG. 2F

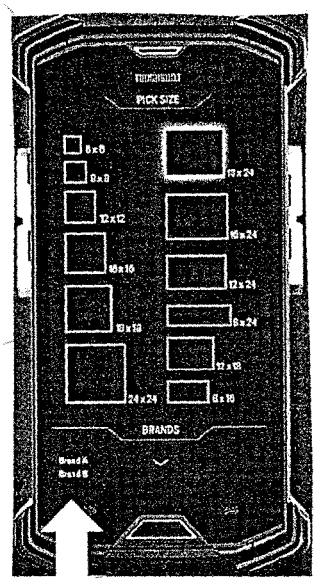
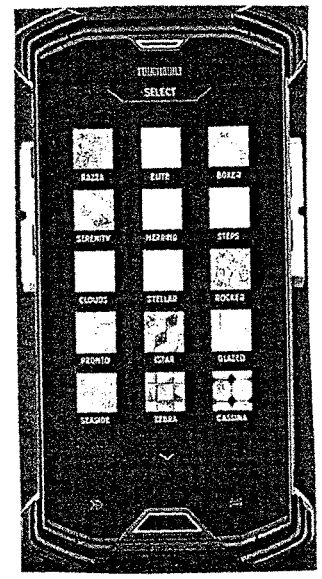
FIG. 8A    FIG. 8B    FIG. 8C
FIG. 8D    FIG. 8E

DUAL LASER MEASURING DEVICE AND ONLINE ORDERING SYSTEM USING THE SAME

PRIORITY

This application claims the benefit of priority to U.S. Provisional Application No. 62/695,286, filed Jul. 9, 2018.

BACKGROUND OF THE INVENTION

Field of the Invention

The invention generally relates to measuring devices and, more specifically, to a dual laser measuring device and online ordering system using the same.

Description of the Prior Art

Mobile devices are a very convenient way to stay connected. Generally, the device is lightweight and compact for easy handling, talking, storage, etc. However, to achieve the desired portability, especially to minimize size, weight, and profile, mobile devices have become extremely fragile. Therefore, it would be desirable for a mobile device that can maintain a compact and lightweight configuration for ergonomic handling, while providing a more durable and ruggedized device.

Laser range finders are well known. A laser range finder and method to measure distance is described, for example, in U.S. Published Patent Application No. 2005/0168721. A similar opto-electronic sensor for distance measurements is described in European Patent Publication EP2088453A1. These systems typically use a transmitter for transmitting a laser beam towards a surface and a receiver for receiving the reflected beam. A processor then analyzes the information and determines the distance that the unit is from the surface being measured.

Also known is a dual laser measuring device that emits laser beams in opposing directions marketed as bilateral laser distance measurer denominated VH-80 by Magpie-tech (www.magpie-tech.com). Single beam laser measurers have also been used in conjunction with mobile phones. The data from the laser measurers is coupled to the mobile phone in some fashion, such as Bluetooth, to allow the combination of the two devices to measure, calculate and record information to measure distances, areas, volumes, etc. One such single beam device is a measurer marketed by Wiseome Inc. under the brand "iPin Spacial Ruler Pro". The device is promoted as making 3-axis measurements of length, width and height and providing a project materials calculator. The problem with many of the prior art devices, however, is that it is not always perfectly horizontal and, to the extent that they deviate from the horizontal discrepancies in measurements can be introduced. This is particularly true when the laser measurers are attached to abut a mobile phone which, itself, is not always held in the same orientation and, therefore, the beams that are emitted are not always horizontal and measurement errors can be introduced.

BRIEF DESCRIPTION OF THE FIGURES

The above and other aspects, features and advantages of the present invention will be more apparent from the following description when taken in conjunction with the accompanying drawings, in which:

FIG. 1A is a side perspective view of an embodiment of a Mobile Device;

FIG. 1B is a front perspective view of an embodiment of the Mobile Device;

FIG. 1C is a bottom perspective view of an embodiment of the Mobile Device;

FIG. 1D is a top perspective view of an embodiment of the Mobile Device;

FIG. 1E is another side perspective view of an embodiment of the Mobile Device;

FIG. 1F is a back perspective view of an embodiment of the Mobile Device;

FIG. 2A is a back perspective view of an embodiment of an associated power accessory to the Mobile Device;

FIG. 2B is a side perspective view of an embodiment of the associated power accessory to the Mobile Device;

FIG. 2C is a top perspective view of an embodiment of the associated power accessory to the Mobile Device;

FIG. 2D is another bottom perspective view of an embodiment of the associated power accessory to the Mobile Device;

FIG. 2E is another back perspective view of an embodiment of the associated power accessory to the Mobile Device;

FIG. 2F is another side perspective view of an embodiment of the associated power accessory to the Mobile Device;

FIG. 8A is a front elevational view of a mobile phone with the dual beam laser measurer (on the reverse side), showing a screen shot for measuring dimensions of a line, area or volume;

FIG. 8B is similar to FIG. 8A but illustrates a screen shot providing a user the option of selecting various standard sizes as an alternative to using actual dimensions obtained in FIG. 8A;

FIG. 8C is similar to FIGS. 8A and 8B showing a user various flooring materials that can be selected for the selected areas;

FIG. 8D is similar to FIGS. 8A-8C but providing a user with a purchase list of items selected based on the unit price of the item, the quantity and the total price;

FIG. 8E is similar to FIGS. 8A-8D but shows the checkout screen when purchase is ready to be sent to a retailer for online ordering of the selected products;

DETAILED DESCRIPTION

Figure 3A:
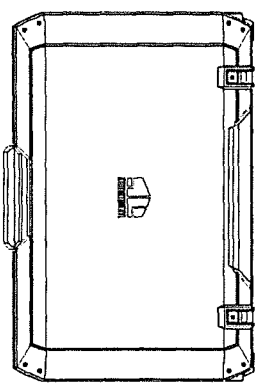
FIG. 3A is a top perspective view of an embodiment of an associated laptop accessory to the Mobile Device.
Figure 3B:
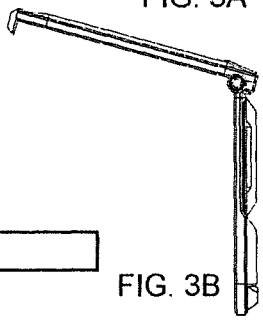
FIG. 3B is a side perspective view of an embodiment of the associated laptop accessory to the Mobile Device.
Figure 3C:
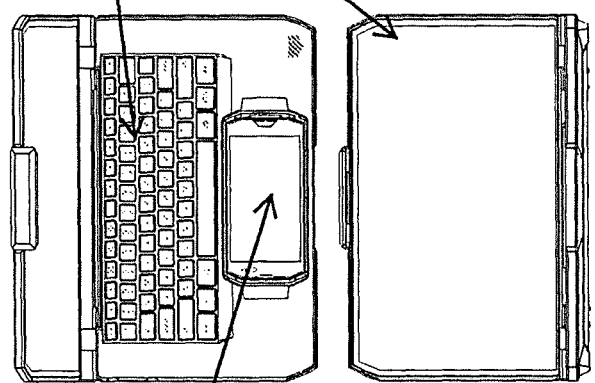
FIG. 3C is a view of the inside of an embodiment of the associated laptop accessory to the Mobile Device.
Figure 3D:
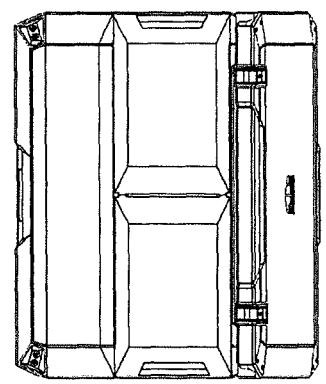
FIG. 3D is a bottom perspective view of an embodiment of the associated laptop accessory to the Mobile Device.
Figure 3E:
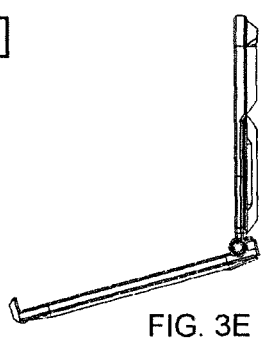
FIG. 3E is another side perspective view of an embodiment of the associated laptop accessory to the Mobile Device.
Figure 4A:
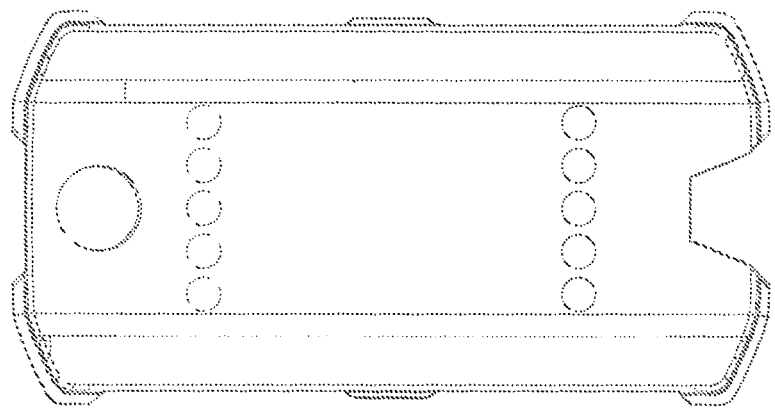
FIG. 4A is a back perspective view of an embodiment of an associated imager accessory to the Mobile Device.
Figure 4B:
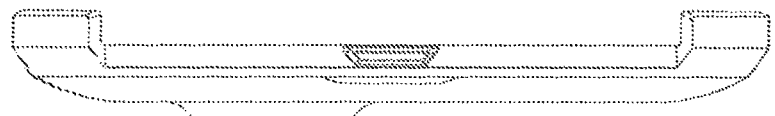
FIG. 4B is a side perspective view of an embodiment of the associated imager accessory to the Mobile Device.
Figures 4C, 4E:
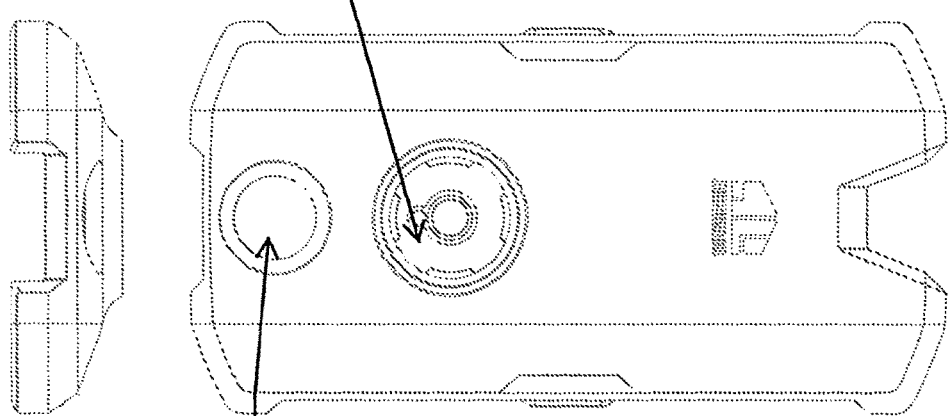
FIG. 4C is a top perspective view of an embodiment of the associated imager accessory to the Mobile Device.
FIG. 4E is another back perspective view of an embodiment of the associated imager accessory to the Mobile Device.
Figure 4D:
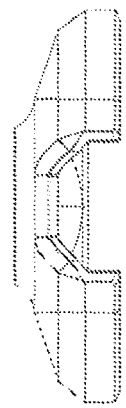
FIG. 4D is a bottom perspective view of an embodiment of the associated imager accessory to the Mobile Device.
Figure 4F:
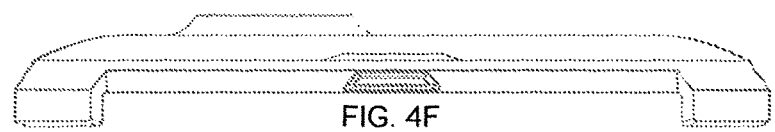
FIG. 4F is another side perspective view of an embodiment of the associated imager accessory to the Mobile Device.
Figure 5A:
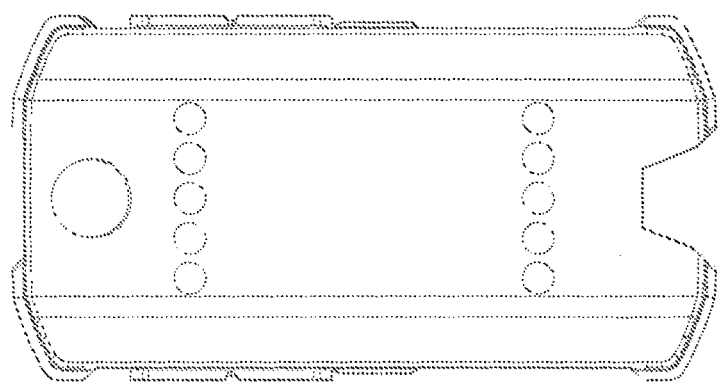
FIG. 5A is a back perspective view of an embodiment of an associated measurement accessory to the Mobile Device.
Figure 5B:
FIG. 5B is a side perspective view of an embodiment of the associated measurement accessory to the Mobile Device.
Figure 5C:
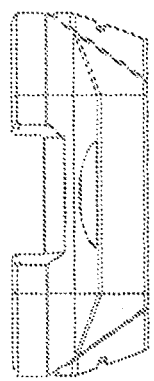
FIG. 5C is a top perspective view of an embodiment of the associated measurement accessory to the Mobile Device.
Figure 5E:
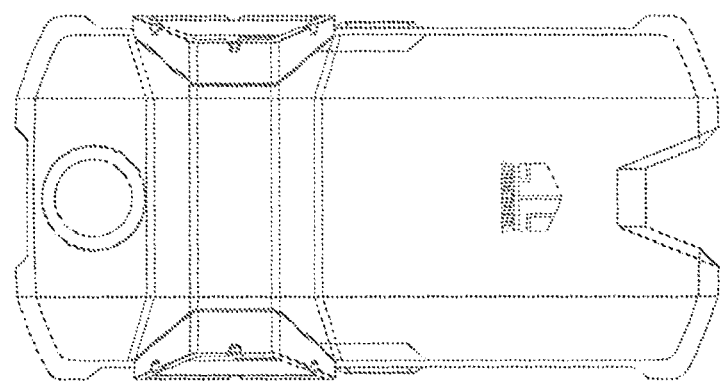
FIG. 5E is another back perspective view of an embodiment of the associated measurement accessory to the Mobile Device.
Figure 5D:
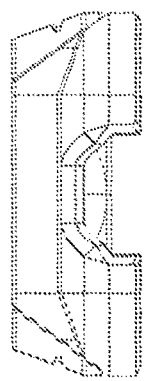
FIG. 5D is a bottom perspective view of an embodiment of the associated measurement accessory to the Mobile Device.
Figure 5F:
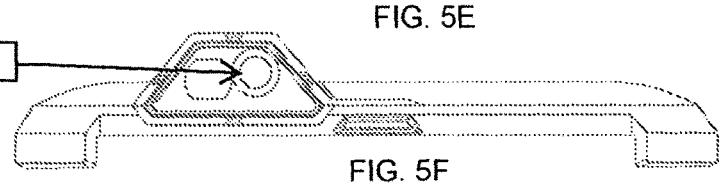
FIG. 5F is another side perspective view of an embodiment of the associated laser accessory to the Mobile Device.
Figure 6A:
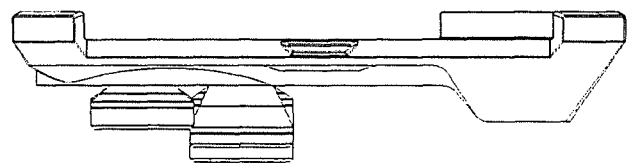
FIG. 6A is a side perspective view of an embodiment of an associated lens accessory to the Mobile Device.
Figures 6B, 6C:
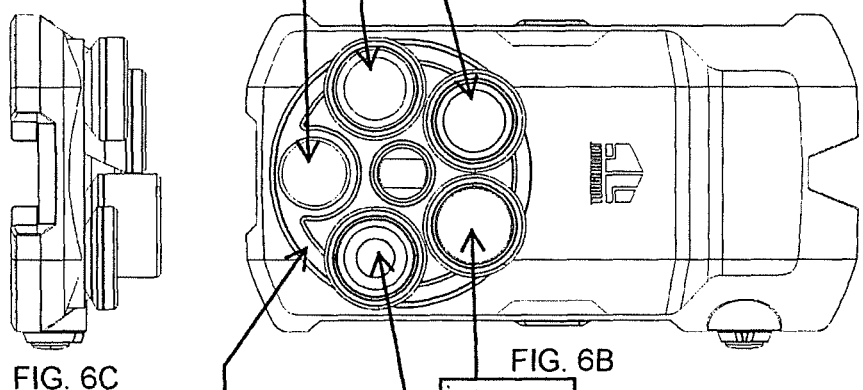
FIG. 6B is a back perspective view of an embodiment of the associated lens accessory to the Mobile Device.
FIG. 6C is a top perspective view of an embodiment of the associated lens accessory to the Mobile Device.
Figure 6D:
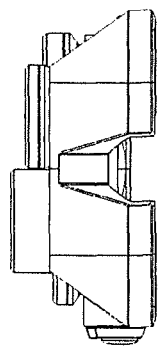
FIG. 6D is a bottom perspective view of an embodiment of the associated lens accessory to the Mobile Device.
Figure 6E:
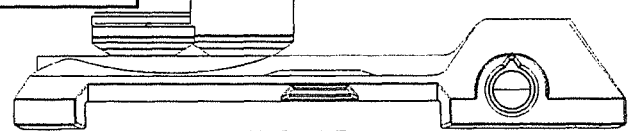
FIG. 6E is another side perspective view of an embodiment of the associated lens accessory to the Mobile Device.
Figure 6F:
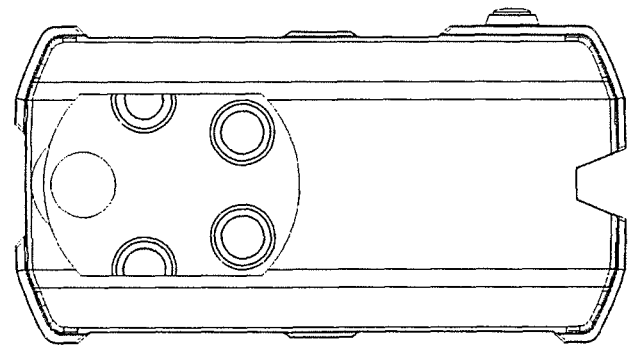
FIG. 6F is another back perspective view of an embodiment of the associated lens accessory to the Mobile Device.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

In an exemplary embodiment, a mobile device is provided. As illustrated in FIGS. 1A through 1F, the mobile device may be rugged. The mobile device may maintain compact and ergonomic handling while being sturdy and durable. For example, a body of the mobile device may include a thick (front/screen to back/case dimension) central portion and narrower perimeter dimension. The casing of the mobile device may include greater wall thickness dimensions at top and bottom terminal ends than along the lateral side or front/back walls. The mobile device casing may include rounded corners of increased thickness.

In an exemplary embodiment, the mobile device may be configured to accept one or more accessories. The one or more accessories may be configured to removably connect to the mobile device at one or more attachment points. For example, the mobile device may include a plurality of attachment points such as clips for which the one or more accessories may removably attach, or hook. The one or more accessories may comprise: a power accessory; a laptop accessory; an imager accessory; a measurement accessory; and a lens accessory.

An exemplary embodiment of a power accessory is illustrated in FIGS. 2A-2F. As illustrated in FIGS. 2A-2F, the power accessory may comprise a battery, a flashlight, a kickstand, and a speaker. The battery may provide power to the mobile device. The kickstand may be pulled away from the power accessory and the mobile device such that the mobile device may be balanced while laying on a side or bottom portion of the mobile device.

An exemplary embodiment of a laptop accessory is illustrated in FIGS. 3A-3E. As illustrated in FIGS. 3A-3E, the laptop accessory may comprise a screen, a keyboard, and a battery. The laptop accessory may also comprise a connector in which the mobile device may be inserted. The laptop accessory may be ruggedized.

An exemplary embodiment of an imager accessory is illustrated in FIGS. 4A-4F. As illustrated in FIGS. 4A-4F, the imager accessory may allow the mobile device to provide thermal images. The imager accessory may also allow the mobile device to provide standard images in addition to thermal images.

An exemplary embodiment of a measurement accessory is illustrated in FIGS. 5A-5F. As illustrated in FIGS. 5A-5F, the measurement accessory may comprise one or more light sources that allow the mobile device to measure dimensions. The one or more light sources may comprise one or more lasers. The mobile device may use measured dimensions to provide one or more calculations.

An exemplary embodiment of a lens accessory is illustrated in FIGS. 6A-6F. As illustrated in FIGS. 6A-6F, the lens accessory may be attached on top of an existing camera on the mobile device. The lens accessory may comprise a shutter button and a zoom button. The shutter button may allow the existing camera to focus and take pictures. The lens accessory may allow the existing camera of the mobile device to function in addition to providing one or more additional lenses that allow the existing camera to take various different picture types. The one or more additional lenses may rotate in front of the existing camera. In an embodiment, the one or more additional lenses may comprise a telephoto lens, a fisheye lens, a wide angle lens, and a macro lens.

The device shown in FIGS. 5A-5F is an accessory for an iphone that incorporates a dual beam laser measuring device that can be attached or clipped on to the rear surface of the phone as shown in FIGS. 1A-1F. Also the attachment mechanism described in U.S. patent application Ser. No. 16/452,235. While the dual laser beam measurer is shown in FIGS. 5A-5F as an accessory to a mobile phone it will be appreciated that a device of this type can be used as a standalone device as to be more fully described.

The operation of single beam and dual beam laser measurers are, as indicated, well known. The mentioned prior art, therefore is incorporated as if fully set forth herein.

Figure 7:
FIG. 7 is a perspective view of a dual beam laser measurer in accordance with the invention as mounted on a mobile phone.

FIG. 7 is a view of a mobile phone with a dual beam laser measuring device attached. The dual laser beam device can be hardwired to the cell phone, such as through USB port, or wirelessly coupled to the mobile phone such as with Bluetooth. Accurate measurements can be obtained even when the mobile phone is accessorized with the dual beam measurer and handheld such as in the middle of a room. Neither the mobile phone nor the dual beam measurer needs to be abutted against a vertical wall or surface to obtain an accurate measurement.

FIGS. 8A-8E are screen shots of an app on a mobile phone that uses the data from the dual beam measuring device. The app, resident within the mobile phone, allows a user to perform the linear measurements, whether length, width or depth and height. Advantageously, the app also allows a user to manually enter dimensions to select from standard or common areas as illustrated in 8B. The example shown in FIGS. 8A-8E illustrates use of the device for calculating floor area for installation of carpet. For flooring these measurements, only require dimensions only the length and width dimensions A, B. Once the area is determined a user can select the flooring material, samples of which are shown in FIG. 8C. The listing is then illustrated in FIG. 8D for various items for a project and a user can enter the quantity of each of the items. The app computes the total amount or cost based on the quantity and the unit price. Once everything has been finalized the user can check out in FIG. 8E and the information communicated directly to a vendor that utilizes a web API or other software ("Application Programming Interface") that forwards the information to the backend of a retailer's ordering software so that the selected materials can be shipped or picked up at the retailor location.

Figure 9:
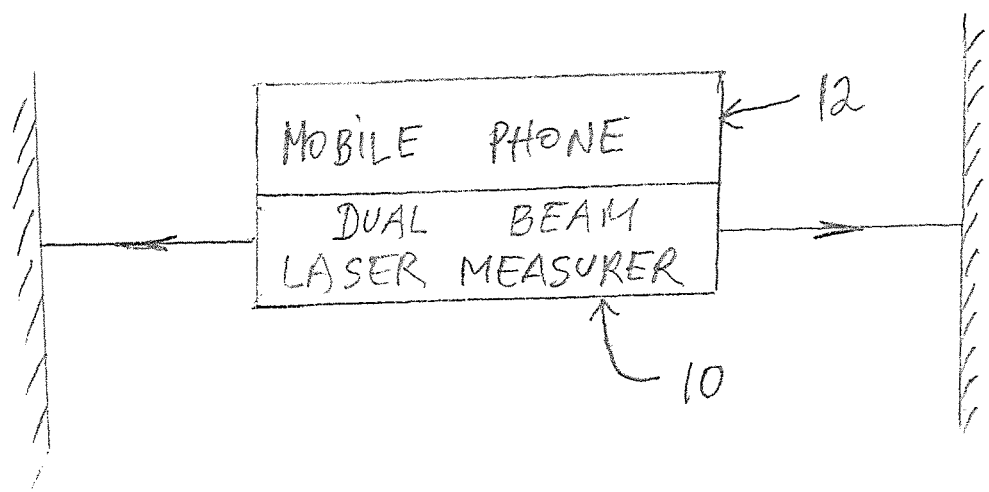
FIG. 9 is a diagrammatic representation of a dual beam laser as an accessory to a smart or mobile phone, as used between two surfaces to measure the distance therebetween.

FIG. 9 illustrates the mobile phone 12 to which the dual beam laser accessory measurer 10 is attached and positioned between two surfaces of the distance being measured.

Figure 10:
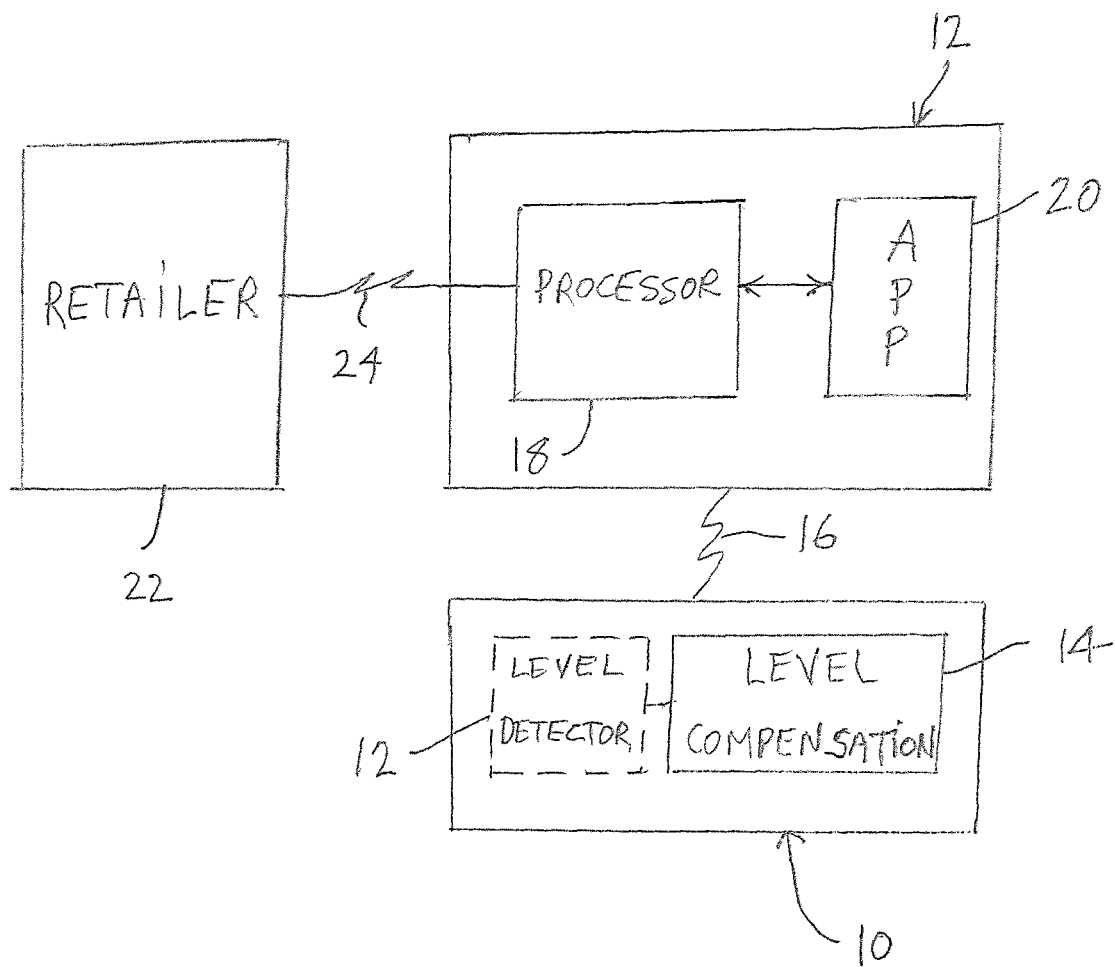
FIG. 10 is a diagrammatic representation of the use of the dual beam laser measurer linked to a mobile phone and to a retailer for transmitting items that are ordered through the retailer for shipment or pickup.

In FIG. 10 the dual beam measurer device 10 is shown to include a level detector 12 when used as a stand alone device. Many mobile smart phones include a 3-axis accelerometer that can measure acceleration forces in 3 dimensions. No matter which way the phone is tilted or moved the unit can determine which is the vertical or horizontal direction. Such an accelerometer, gyroscope, compass, etc., included within the dual beam laser measurer 10 providing level compensation can be provided by 14 prior to information being sent to the mobile phone 12 or when used as a stand-alone device. When the accessory 10 is not used as a standalone device but coupled to a smart phone the level detection within the smart phone itself can be used.

Once data is transmitted at 16 to the smart phone 12 the processor 18 in conjunction with the app 20 can generate screens of the type shown in FIGS. 8A-8D.

Once the purchase has been finalized within the app 20 the information can be sent to a retailer's Web API either through a Wifi or cell network connection 24. FIGS. 8A-8E are only exemplary for covering flooring. For air conditioning, the volume of an enclosure needs to be calculated in which case dimensions A, B and C need to be measured. For determining the amount of paint required to cover one or more walls, the areas of the walls need to be measured, in which case dimensions B and C need to be measured for each of the walls and the total either added manually or the app can determine the total surface area. The tile size can be selected either manually by inputting dimensions or connecting to a retailer's website. Specifications can be added for linoleum, rolled with layers of paint, floor board, etc. It will be evident from the above, that the dual beam laser measurer significantly simplifies calculations of quantities of materials, and ordering selected or required items of a project can be done with minimal time and effort. One merely needs to stand in the middle of a room to quickly measure length, width and/or height to calculate areas and volumes and to estimate materials in three simple steps to which materials may be immediately selected and ordered.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed:

1. A laser measurer comprising a housing defining a direction along which a linear measurement is to be made; first and second lasers within said housing for generating two laser beams emanating from said housing in opposite or opposing directions along said measurement direction; level compensation within said housing; and an app for performing computations to provide at least one of linear, surface and volume data and presenting a plurality of materials for selection by a user and sending a quantity of selected material on the basis of said calculated at least one of said linear, surface and volume data to a retailer's Web Application Programming Interface (API) for completing an order for shipment and/or pickup of a correct quantity of said selected material.

2. A laser measurer accessory for a mobile phone comprising a housing defining a measurement direction along which a linear measurement is to be made; first and second lasers within said housing for generating two laser beams emanating from said housing in opposite or opposing directions along said measurement direction; means for coupling measured data to a mobile phone; and an app within said mobile phone for performing computations to provide at least one of linear, surface and volume data to a retailer's Web Application Programming Interface (API) for completing an order for shipment and/or pickup of a correct quantity of said selected material required for a project.

3. A system for determining and ordering materials required for a project comprising a mobile phone with a processor and level detector; a dual laser beam measurer coupled to said mobile phone; an app residing in said mobile phone for utilizing data received from said measurer to compute at least one of linear dimensions, surface areas and volumes and enabling a user to select type and quantities of materials on the basis of at least one of said linear dimensions, surface areas and volumes; and means for transmitting the selected materials and quantities over Wi-Fi or cellular network to a retailer's Application Programming Interface (API) for completing an order for shipment and/or pickup of a correct quantity of said selected materials.

4. A laser measurer as defined in claim 1, wherein said app provides and displays available samples of said plurality of samples for selection by a user.

5. A laser measurer as defined in claim 4, wherein said app calculates cost for selected sample or samples on the basis of said calculated linear, surface and volume data.

6. A laser measurer accessory for a mobile phone as defined in claim 2, wherein said app provides and displays available samples of said plurality of samples for selection by a user.

7. A laser measurer accessory for a mobile phone as defined in claim 6, wherein said app calculates cost for selected sample or samples on the basis of said calculated linear, surface and volume data.

8. A system for determining and ordering materials required for a project as defined in claim 3, wherein said app provides and displays available samples of said plurality of samples for selection by a user.

9. A system for determining and ordering materials required for a project as defined in claim 8, wherein said app calculates cost for selected sample or samples on the basis of said calculated linear, surface and volume data.

\* \* \* \* \*